(12) United States Patent
Kim et al.

(10) Patent No.: US 10,981,590 B2
(45) Date of Patent: Apr. 20, 2021

(54) STEERING COLUMN ASSEMBLY

(71) Applicant: ERAE AMS CO., LTD., Daegu (KR)

(72) Inventors: Young-Kwang Kim, Daegu (KR); Duck-Moo Jung, Daegu (KR); Min Young Choi, Daegu (KR); Se-Hun Jung, Daegu (KR); Moo Young Park, Daegu (KR); Hwan Gong Moon, Daegu (KR); Jae Won Jung, Daegu (KR); Ho Cheol Son, Daegu (KR); Cheol Jeon, Daegu (KR)

(73) Assignee: ERAE AMS CO., LTD., Daegu (KR)

( * ) Notice: Subject to any disclaimer, the term of this patent is extended or adjusted under 35 U.S.C. 154(b) by 0 days.

(21) Appl. No.: 16/935,708

(22) Filed: Jul. 22, 2020

(65) Prior Publication Data
US 2020/0346680 A1 Nov. 5, 2020

Related U.S. Application Data

(63) Continuation of application No. PCT/KR2019/003005, filed on Mar. 15, 2019.

(30) Foreign Application Priority Data

Apr. 17, 2018 (KR) .......................... 10-2018-0044333

(51) Int. Cl.
*B62D 1/184* (2006.01)
*B62D 1/19* (2006.01)
(52) U.S. Cl.
CPC ............... *B62D 1/184* (2013.01); *B62D 1/19* (2013.01)

(58) Field of Classification Search
CPC .................................. B62D 1/184; B62D 1/19
See application file for complete search history.

(56) References Cited

U.S. PATENT DOCUMENTS

| 8,375,822 | B2 | 2/2013 | Ridgway et al. |
| 8,403,364 | B2 | 3/2013 | Monteil et al. |
| 8,500,168 | B2 | 8/2013 | Goulay et al. |
| 10,717,457 | B2 * | 7/2020 | Dubay .................... B62D 1/19 |

(Continued)

FOREIGN PATENT DOCUMENTS

| JP | 2014-213692 A | 11/2014 |
| KR | 10-2016-0057631 A | 5/2016 |
| KR | 10-2017-0117765 A | 10/2017 |

OTHER PUBLICATIONS

International Search Report for PCT/KR2019/003005 dated Jun. 21, 2019 [PCT/ISA/210].

*Primary Examiner* — Faye M Fleming
(74) *Attorney, Agent, or Firm* — Sughrue Mion, PLLC

(57) ABSTRACT

A steering column assembly includes a mounting bracket having a first arm and a second arm, a steering column and a locking device which is configured to be in a locking state or an unlocking state to selectively allow a tilt motion of the supporting housing and the steering column by applying or removing clamping force to or from the first arm and the second arm. The locking device includes a tilting bolt which is connected to the lever to rotate together with the lever and passes through the first arm and the second arm to be able to rotate between the locking state and the unlocking state and a first locking unit and a second locking unit which respectively operate in response to rotation of the tilting bolt and selectively apply clamping force to the first and the second arms.

13 Claims, 12 Drawing Sheets

(56) References Cited

U.S. PATENT DOCUMENTS

| | | |
|---|---|---|
| 2008/0202276 A1 | 8/2008 | Harris et al. |
| 2010/0300238 A1 | 12/2010 | Ridgway et al. |
| 2020/0047788 A1* | 2/2020 | Park .................. B62D 1/187 |
| 2020/0255052 A1* | 8/2020 | Kim ................... B62D 1/192 |

* cited by examiner (a)

(b)

(a)

(b)

STEERING COLUMN ASSEMBLY

CROSS REFERENCE TO RELATED APPLICATIONS

This application is a Bypass Continuation of International Application No. PCT/KR2019/003005 filed Mar. 15, 2019, claiming priority based on Korean Patent Application No. 10-2018-0044333 filed Apr. 17, 2018.

TECHNICAL FIELD

The present invention relates to a steering column assembly for vehicles.

BACKGROUND ART

A steering column assembly is an apparatus which is connected to a steering wheel to steer in response to a manipulation of a driver. A steering column assembly is generally configured to allow a tilt motion and a telescopic motion for a convenience of a driver. A tilt motion regulates an angular position of a steering wheel, and the telescopic motion regulates a longitudinal position of a steering column. Also, a locking device is provided which selectively allows the tilt motion and the telescopic motion. The tilt motion and the telescopic motion are restricted so as to maintain a position of the steering wheel when the locking device is in a locking state, and the tilt motion and the telescopic motion are allowed when the locking device is in an unlocking state.

When an impact caused by a vehicle collision is applied to a steering column having a tilt function, a tilt-up phenomenon that a steering column is slightly lifted in spite of locking function of a locking device. In order to prevent the tilt-up, a method that a locking device is provided with an auxiliary tilt locking structure for supplementing the tilt locking function has been introduced, and the auxiliary tilt locking structure is configured to prevent a tilt-up of a tilting bolt by teeth engagement.

Generally, a steering column assembly includes a mounting bracket for mounting a steering column, and the mounting bracket includes a first arm and a second arm facing one another.

The locking device includes a lever which can rotate between a locking position and an unlocking position, and the lever is disposed to contact an outer surface of one of the first and the second arms. A conventional auxiliary tilt locking structure is arranged between the lever and an outer surface of one of the first and the second arms.

Since such a conventional auxiliary tilt locking structure is disposed only at an outer surface of an arm of two arms to which the lever is connected, a side force may be generated at an opposite end in a collision, and a tilt-up may be occurred at the side where the auxiliary tilt locking device is not disposed and this may deteriorate the crash performance.

PRIOR ART DOCUMENTS

U.S. Pat. No. 3,375,822 (Date of patent: Feb. 19, 2013)
U.S. Pat. No. 8,403,364 (Date of patent: Mar. 26, 2013)
U.S. Pat. No. 8,500,168 (Date of patent: Aug. 6, 2013)

DETAILED DESCRIPTION OF THE INVENTION

Technical Problem

The present invention has been made in an effort to provide a steering column assembly which can effectively prevent tilt-up phenomenon of a steering column by side force generated in the event of vehicle collision.

Technical Solution

A steering column assembly according to an embodiment of the present invention includes: a mounting bracket which has a first arm and a second arm facing one another; a supporting housing which is disposed between the first arm and the second arm to be tiltable about the mounting bracket; a steering column which passes through the supporting housing so as to be able to undergo a tilt motion together with the supporting housing; and a locking device which is configured to be in a locking state or an unlocking state to selectively allow a tilt motion of the supporting housing and the steering column by applying or removing clamping force to or from the first arm and the second arm. The locking device includes: a lever which is able to rotate between a locking position and an unlocking position; a tilting bolt which is connected to the lever to rotate together with the lever and passes through the first arm and the second arm to be able to rotate between the locking state and the unlocking state; a first locking unit which is configured to selectively applying a clamping force to the first arm to selectively realize a tilt locking and to selectively realize an auxiliary tilt locking via selective teeth engagement in response to rotation of the tilting bolt; and a second locking unit which is configured to selectively applying a clamping force to the second arm to selectively realize a tilt locking and to selectively realize an auxiliary tilt locking via selective teeth engagement in response to rotation of the tilting bolt.

The first locking unit may be provided between the lever and an outer surface of the first arm, and the second locking unit may be provided at an outer surface of the second arm.

The first locking unit may include: a lever cam block which is configured to be able to apply a clamping force to the first arm by cam operation in response to rotation of the lever; a first tilt cam block which is connected to the tilting bolt so as to rotate together with the tilting bolt; a first tilt block which is connected to the first arm and has a first fixed teeth; a first tilt locking block which has a first moving teeth which can be engaged with the first fixed teeth in response to cam operation by rotation of the first tilt cam block; and a first elastic member which elastically supports the first tilt locking block in a direction in which the first moving teeth is separated from the first fixed teeth.

The first tilt block may include: a body portion which defines a through hole formed along a longitudinal axis of the tilting bolt; a pair of supporting portions which are respectively formed on both ends of a surface of the body portion facing the lever; and an insertion protruded portion which is inserted into a through hole formed in the first arm. The first fixed teeth may be formed on a surface defining the through hole of the body portion.

The lever cam block may include: a cam surface for cam operation; and a pair of supporting surfaces which are respectively supported by the pair of supporting portions of the first tilt block.

The first tilt cam block may have a protruded cam, and the first tilt locking block may have a receiving space for receiving the first tilt cam block and a cam supporting surface which is formed on a surface forming the receiving space.

The elastic member may be supported against one of the pair of the supporting portions of the first tilt block to elastically support the first tilt locking block.

The elastic member may include an elastic force providing portion having a shape of a convex curve supporting the first tilt locking block and a pair of supporting legs which are respectively connected on both ends of the elastic force providing portion, and the pair of supporting legs may be supported against the supporting portion of the first tilt block.

The second locking unit may include: a guide block which is disposed outside the second arm and is configured to be able to apply clamping force to the second arm in response to an axial movement of the tilting bolt; a second tilt cam block which is connected to the tilting bolt to rotate together with the tilting bolt; a second tilt block which is connected to the second arm and has a second fixed teeth; a second tilt locking block having a second moving teeth which is able to be engaged with the second fixed teeth in response to cam operation by rotation of the second tilt cam block; and a second elastic member which elastically supports the second tilt locking block in a direction in which the second moving teeth is separated from the second fixed teeth.

The steering column may include an upper jacket and a lower jacket which are connected to one another to be relatively movable in a longitudinal direction. The steering column assembly may further include: an auxiliary telescopic locking structure which is configured to selectively allow the lower jacket to move in a longitudinal direction in response to the locking state and the unlocking state of the locking device; and an energy absorption member which is configured to perform energy absorption when the upper jacket moves relative to the lower jacket in a state that the auxiliary telescopic locking structure does not allow the lower jacket to move in the longitudinal direction.

The auxiliary telescopic locking structure may include: a rotating member which is connected to the tilting bolt to rotate together with the tilting bolt; a locking member which is configured to rotate between a locking position and an unlocking position by rotation of the rotating member; and a biasing member which provides force to bias the locking member to the locking position.

The rotating member may include: a body portion which is connected to the tilting bolt; a pair of legs which are respectively protruded from both ends of the body portion; and a driving rod which connects the pair of legs. The locking member may be provided with a slot into which the driving rod is inserted, and the lower jacket and the locking member may respectively have locking teeth which are selectively engaged with one another by rotation of the locking member.

A steering column assembly according to another embodiment of the present invention includes: a mounting bracket which has a first arm and a second arm; a steering column which passes between the first and the second arms to be tiltable; and a locking device which is configured to be a locking state or an unlocking state to selectively allow a tilt motion of the steering column by applying or removing a clamping force to or from the first arm and the second arm. The locking device includes: a tilting bolt which passes through the first arm and the second arm to be able to rotate between the locking state and the unlocking state; and a first locking unit and a second locking unit which are configured to operate respectively in response to rotation of the tilting bolt and are configured to be able to selectively apply clamping force to the first and the second arms from outside of the first and the second arms.

The first locking unit may include: a lever cam block which is configured to be able to apply a clamping force to the first arm by cam operation in response to rotation of the lever; a first tilt cam block which is connected to the tilting bolt so as to rotate together with the tilting bolt; a first tilt block which is connected to the first arm and has a first fixed teeth; a first tilt locking block which has a first moving teeth which can be engaged with the first fixed teeth in response to cam operation by rotation of the first tilt cam block; and a first elastic member which elastically supports the first tilt locking block in a direction in which the first moving teeth is separated from the first fixed teeth.

The second locking unit may include: a guide block which is configured to be able to apply clamping force to the second arm in response to an axial movement of the tilting bolt; a second tilt cam block which is connected to the tilting bolt to rotate together with the tilting bolt; a second tilt block which is connected to the second arm and has a second fixed teeth; a second tilt locking block having a second moving teeth which is able to be engaged with the second fixed teeth in response to cam operation by rotation of the second tilt cam block; and a second elastic member which elastically supports the second tilt locking block in a direction in which the second moving teeth is separated from the second fixed teeth.

Advantageous Effects

According to the present invention, since the first and the second locking units provide respectively auxiliary tilt locking at both outsides of the pair of arms, tilt-up phenomenon which is caused by side force acting one of the two lateral sides of the mounting bracket when impact acts on the steering column in the tilt locking state can be effectively prevented.

DETAILED DESCRIPTION OF THE EMBODIMENTS

Embodiments of the present invention will be described in detail with reference to the accompanying drawings.

Referring to FIG. 1 to FIG. 4, a steering column assembly includes a steering column 10, a supporting housing 23 and a mounting bracket 20. The steering column 10 may be configured to be able to undergo a tilt motion along a tilt direction 16 with respect to the mounting bracket 20 and further to be able to undergo a telescopic motion along a telescopic direction 15. Hereinafter an embodiment in which the steering column 10 can undergo both the tilt motion and the telescopic motion.

Figure 5:
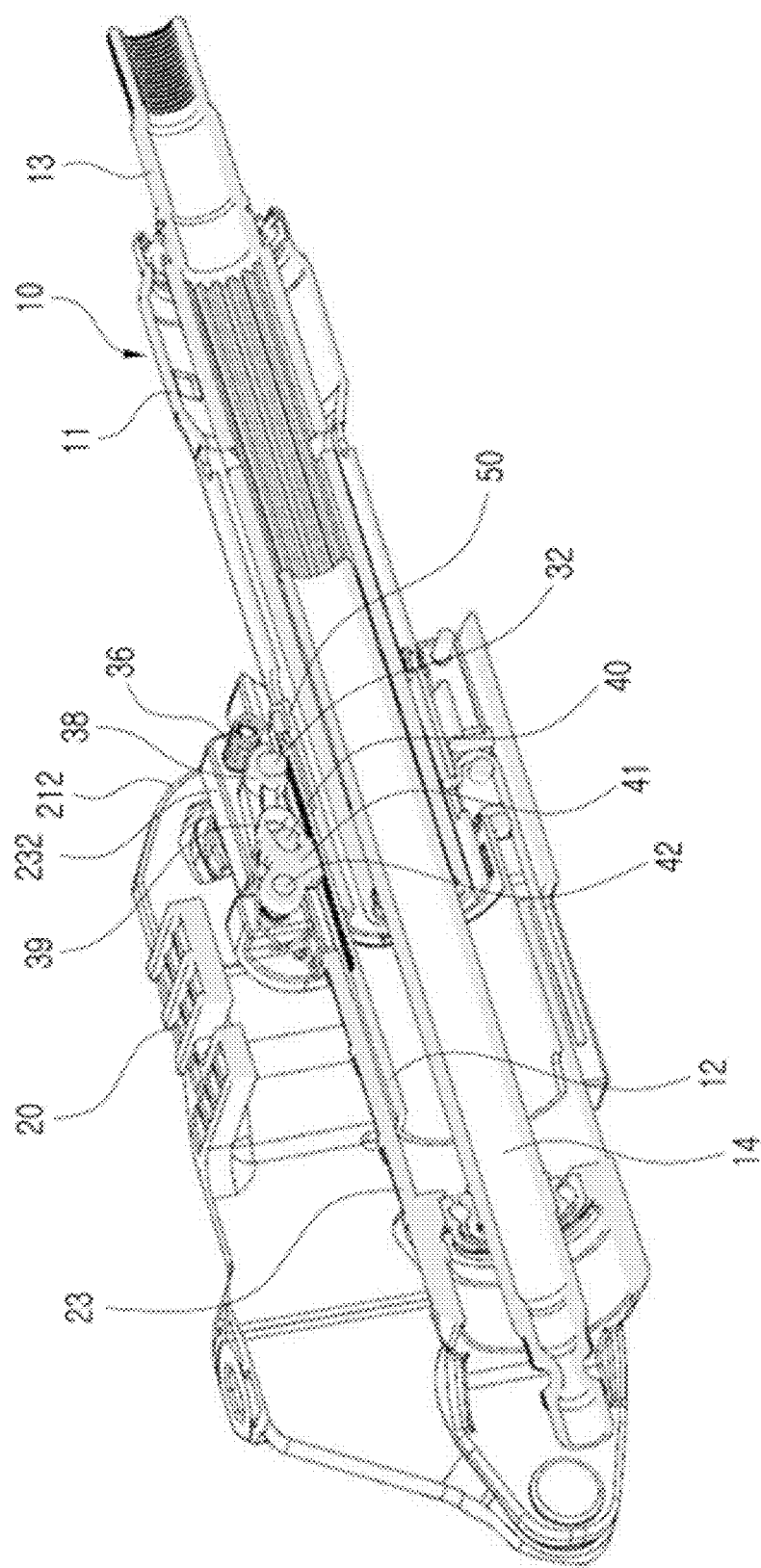
FIG. 5 is a sectional view taken along a line V-V in FIG. 1.

Referring to FIG. 5, the steering column 10 may include an upper jacket 11, a lower jacket 12, an upper steering shaft 13 and a lower steering shaft 14. The upper jacket 11 and the lower jacket 12 may respectively have a tubular shape, and one end portion of the upper jacket 11 is inserted into the lower jacket 12 to be movable along a longitudinal direction thereof. The lower jacket 12 may be disposed to pass through the supporting housing 23 to be movable along the telescopic direction 15 relative to the supporting housing 23, and the upper jacket 11 and the lower jacket 12 may tilt and move together in a tilt motion and a telescopic motion. Meanwhile, in case that the steering column 10 is configured to be collapsible in the event of collision, the lower jacket 12 may be prohibited from linearly moving in a locking state and the upper jacket 11 may move relative to the lower jacket 12 so as to absorb impact energy.

The upper and the lower steering shafts 13 and 14 penetrates the upper and the lower jackets 13 and 14 in a rotatable state, and the upper and the lower steering shafts 13 and 14 rotate together and move relative to one another. For example, the upper and the lower steering shafts 13 and 14 may be coupled to one another via a spline coupling allowing a relative axial movement. The upper steering shaft 13 is configured to move together with the upper jacket 11 and is connected to the lower steering shaft 13 so as to rotate therewith. The upper steering shaft may be configured to undergo both rotation and sliding, and the lower shaft 14 may be configured to be able to rotate while being prohibited from sliding. The upper and the lower jackets 11 and 12 may be configured to be able to slide while being prohibited from rotating. In a normal steering operation the upper steering shaft 13 and the lower steering shaft 14 may rotate together, and in a telescopic motion the upper steering shaft 13, the upper jacket 11 and the lower jacket 13 may slide together. Meanwhile, in case that a collapse of the steering column occurs by an external impact in a locking state, the upper jacket 11 slides together with the upper steering shaft 13 relative to the lower jacket 12.

Figure 1:
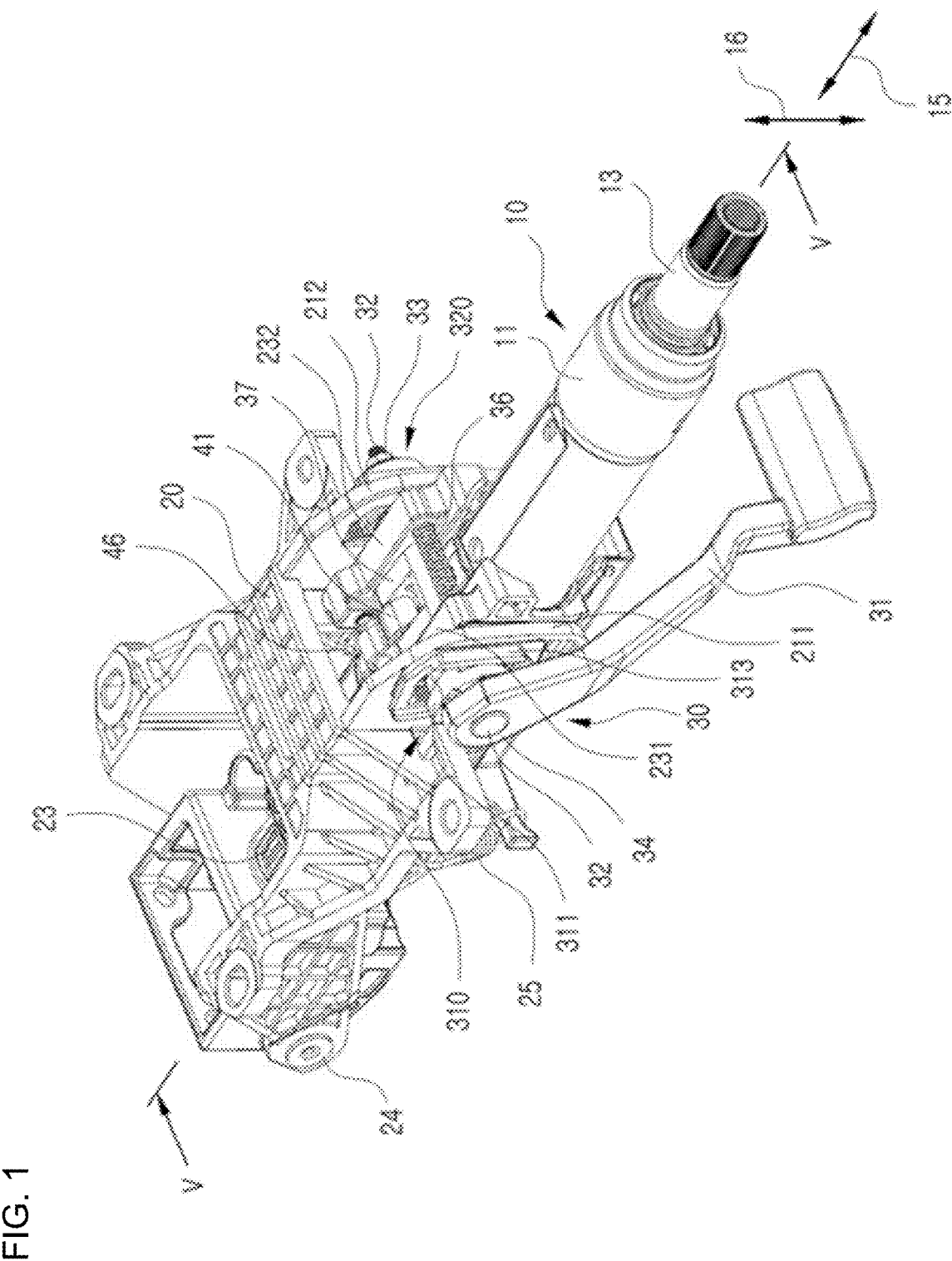
FIG. 1 is a perspective view of steering column assembly according to an embodiment of the present invention.
Figure 2:
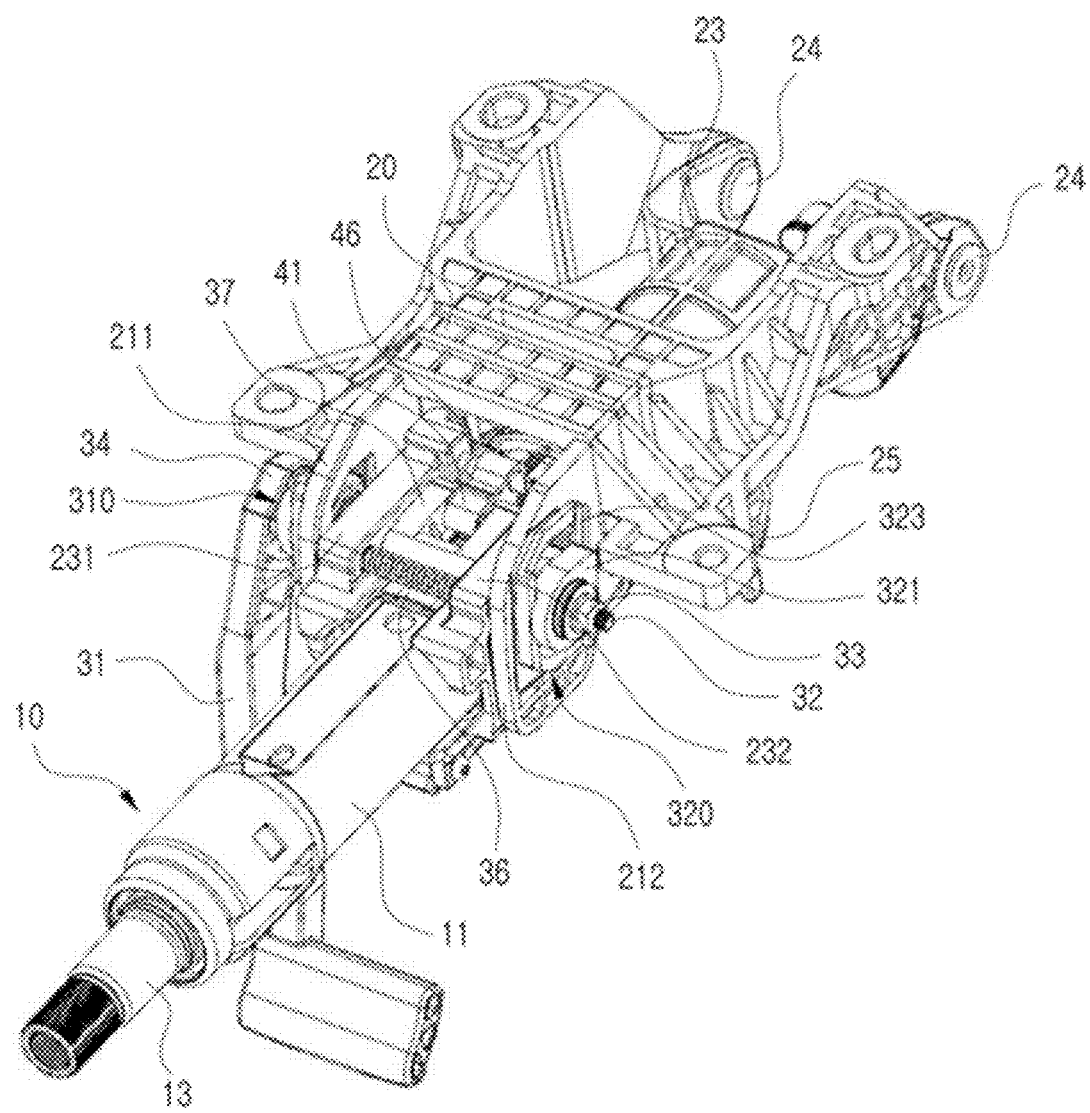
FIG. 2 is another perspective view of a steering column assembly according to an embodiment of the present invention.
Figure 3:
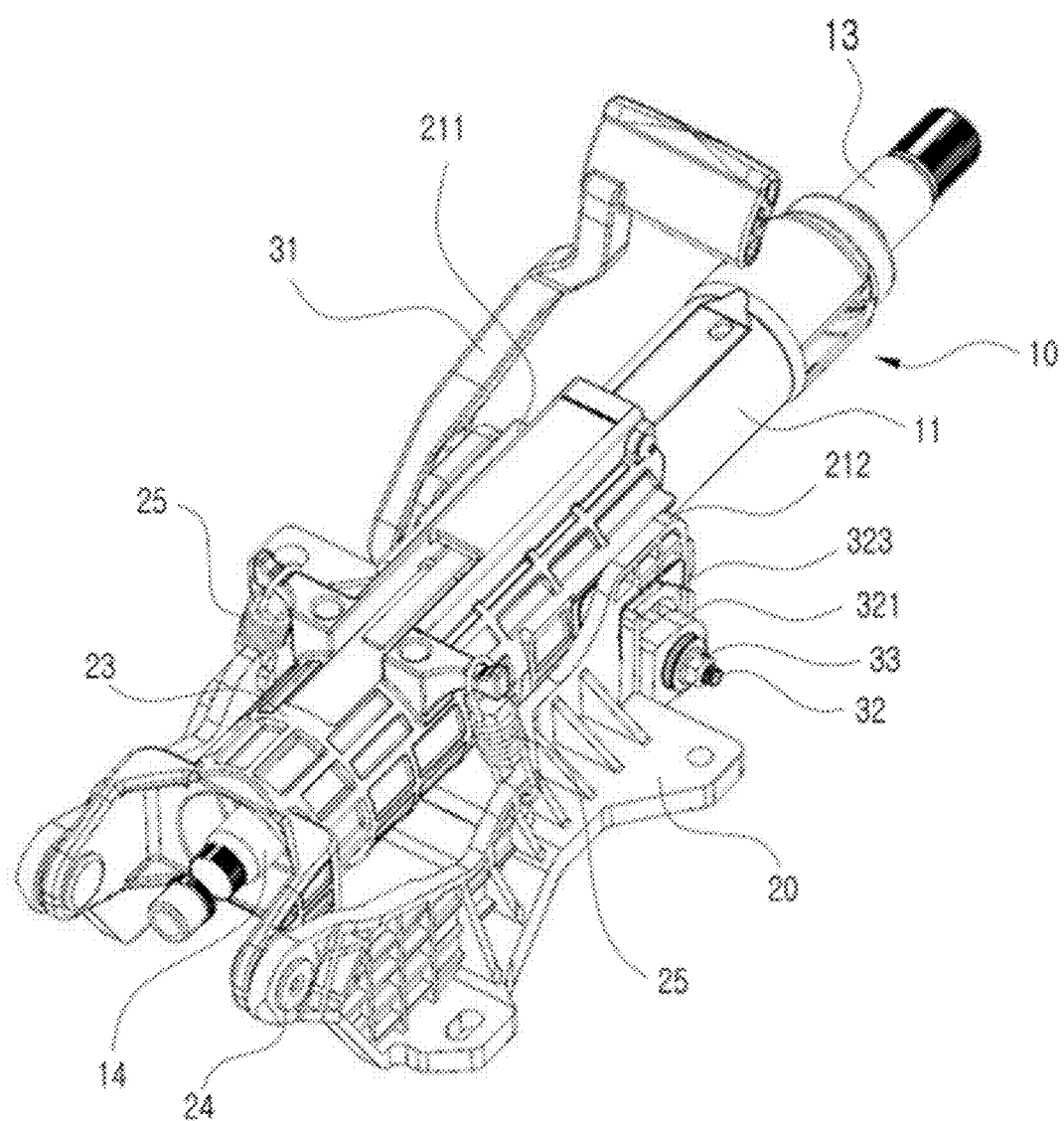
FIG. 3 is a bottom perspective view of a steering column assembly according to an embodiment of the present invention.
Figure 4:
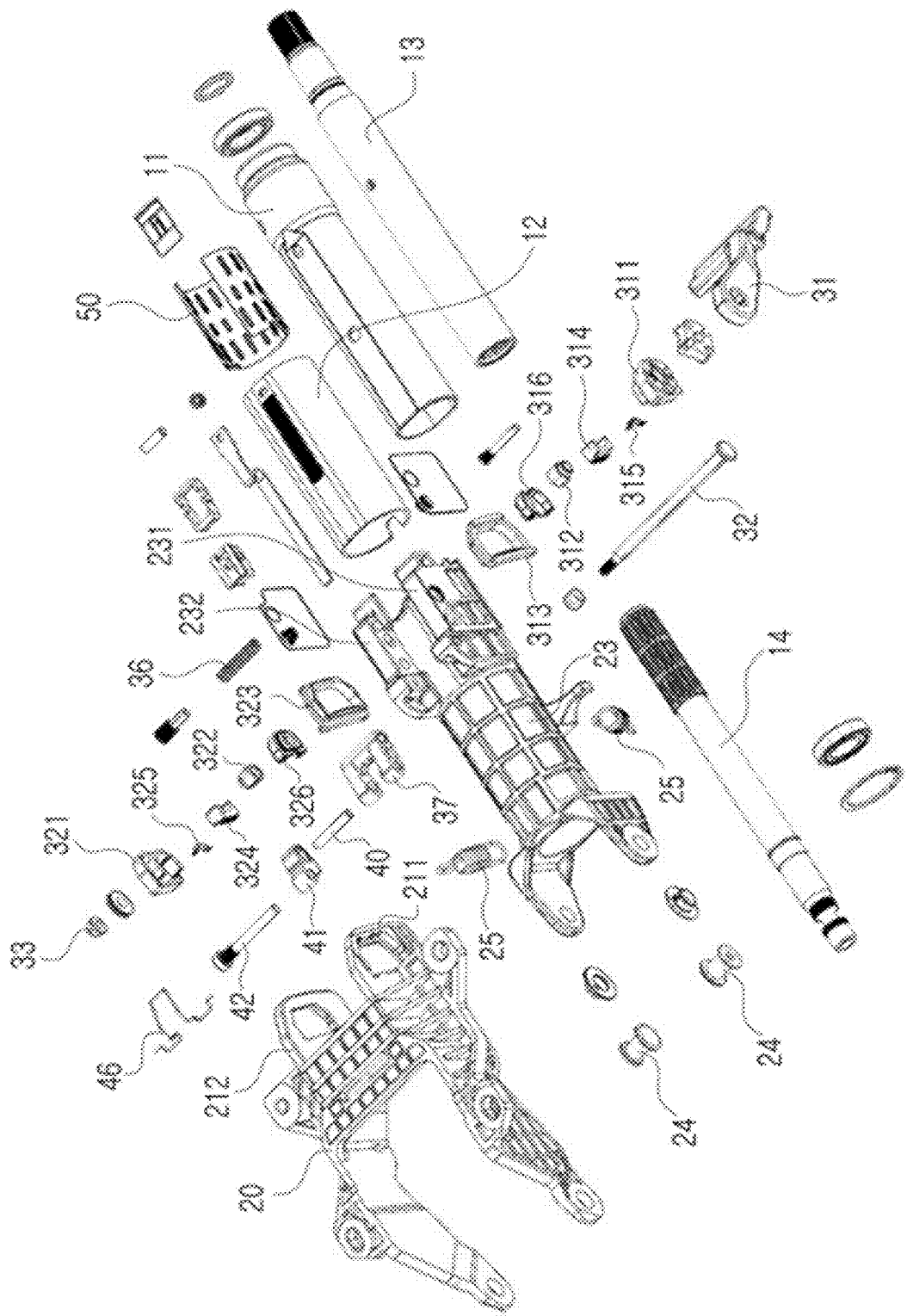
FIG. 4 is an exploded perspective view of a steering column assembly according to an embodiment of the present invention.

Referring to FIG. 1 and FIG. 2, the supporting housing 23 may be connected to the mounting bracket 20 to be tiltable. The supporting housing 23 may be connected to the mounting bracket 20 via a tilt shaft 24. The supporting housing 23 may define a cylindrical receiving space which is elongated in a longitudinal direction, and the steering column 10 may be slidably disposed in this receiving space. By the sliding of the steering column 10 within the supporting housing 23 a telescopic motion of the steering column 10 occurs, and by the tilting of the steering column 10 together with the supporting housing 23 a tilt motion of the steering column 10 occurs. That is, the steering column 10 is inserted into the supporting housing 23 to undergo both a telescopic motion via movement relative to the supporting housing 23 and a tilt motion together with the supporting housing 23.

The supporting housing 23 may include a first leg 231 and a second leg 232 which respectively face the first and the second arms 211 and 212. As shown in FIG. 1 and FIG. 2, the first leg 231 and the second leg 232 are disposed to be spaced from one another to contact inner surfaces of the first and the second arms 212 and 212 respectively.

A return spring 36 for assisting returning of the first and the second legs 231 and 232 of the supporting housing 23 to their original position during the conversion from the locking state to the unlocking state may be provided. The return spring 36 may be set to elastically outwardly support the first and the second legs 231 and 232.

A spring member 25 for preventing the supporting housing 23 and the steering column 10 from falling down may be provided. The spring member 25 may be a coil spring having elastic resilient force, and one end thereof is connected to the mounting bracket 20 and the other end thereof may be connected to the supporting housing 23 so as to elastically support the supporting housing 23 and the steering column 10 inserted therein toward the mounting bracket 20.

The steering column assembly includes a locking device 30 which is configured to selectively become a locking state and an unlocking state to selectively allow tilt motions of the supporting housing 23 and the steering column 10. The tilt motion is blocked when the locking device 30 is in a locking state, and the tilt motion is allowed when the locking device 30 is in an unlocking state. At this time, it is configured that the telescopic motion is also blocked or allowed in a locking state or in an unlocking state.

The locking device 30 is configured to selectively apply clamping force to the first and the second arms 211 and 212 so as to selectively allow the telescopic motion and the tilt motion of the steering column 10.

The locking device 30 may include a lever 31 which is rotatable between a locking position and an unlocking position and a tilting bolt 32 which is connected to the lever 31 to rotate together with the lever 31 so as to rotate between a locking position and an unlocking position. The lever 31 may be formed in a shape which can be rotated by a driver, and the tilting bolt 32 may penetrate the first and the second arms 211 and 212 of the mounting bracket 20 and the first and the second legs 231 and 232 of the supporting housing 23. The tilting bolt 32 defines a longitudinal axis across the first and the second arms 211 and 212 of the mounting bracket 20 and the first and the second legs 231 and 232 of the supporting housing 23, and is configured to be able to rotate about this longitudinal axis. At this time, both end portions of the tilting bolt 32 are jutted out from outer side of the first and the second arms 211 and 212 of the mounting bracket 20, and the lever 31 may be connected to one end portion and a fixing nut 33 may be connected to the other end portion. The lever 31 may be coupled to the tilting bolt 32 via a base portion 34 so as to rotate together with the tilting bolt 32, and the fixing nut 33 may be engaged to a thread which is provided at an end portion of the tilting bolt 32. Under these configurations, the tilting bolt 32 can rotate about its longitudinal axis by the rotation of the lever 31.

A steering column assembly according to an embodiment of the present invention adopts a dual locking structure having two locking units in order to secure respective locking on both sides of the arms 211 and 212 of the mounting bracket 20. For this function the locking device 30 includes a first locking unit 310 and a second locking unit 320. The first locking unit 310 is configured to selectively apply clamping force in response to rotation of the tilting bolt 32 to the first arm 211 so as to selectively realize the tilt locking and so as to selectively realize an auxiliary tilt locking through a selective teeth engagement. As shown in FIG. 1 and FIG. 2, the second locking unit 320 is provided between the base portion 34 of the lever 31 which is connected to one end of the tilting bolt 32 and the first arm 211, and the second locking unit 320 is provided between the fixing nut 33 which is connected to the other end of the tilting bolt 32 and the second arm 212.

Figure 6:
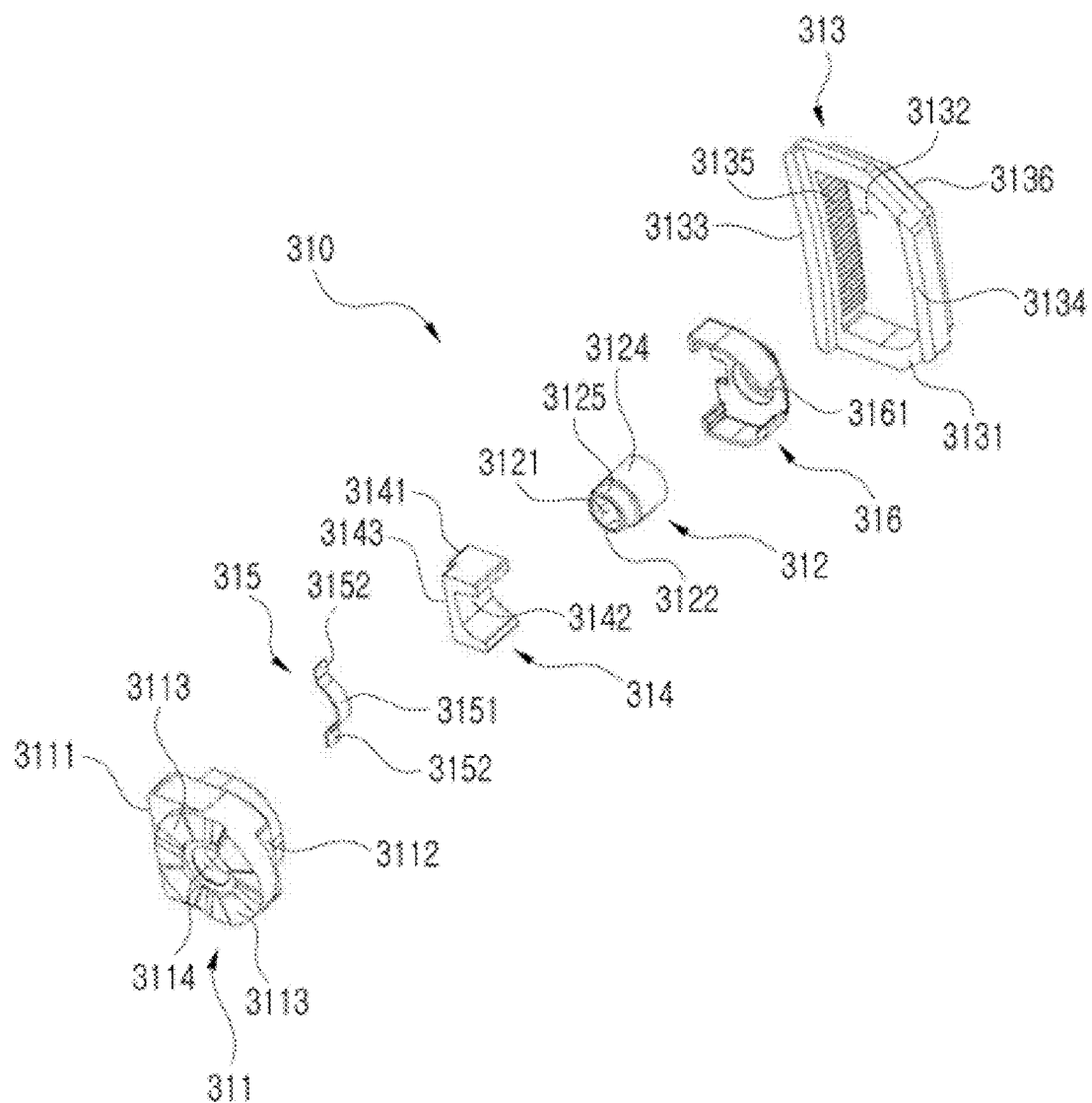
FIG. 6 is an exploded perspective view of a first locking unit of a steering column assembly according to an embodiment of the present invention.
Figure 7:
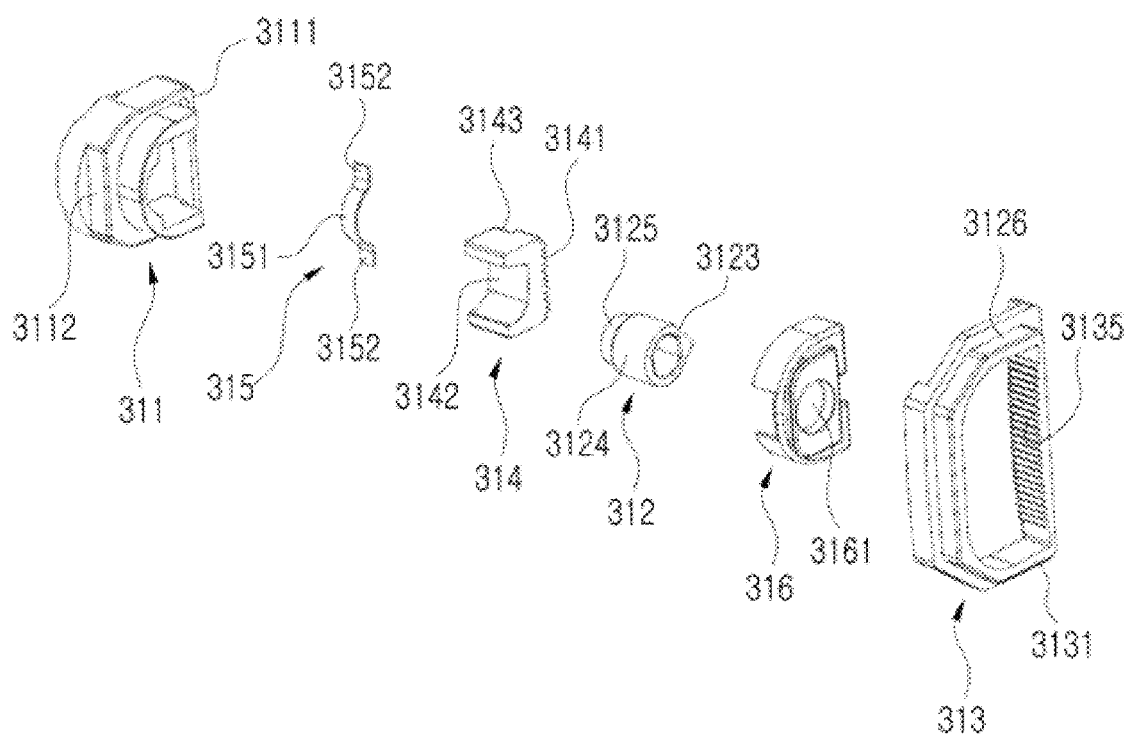
FIG. 7 is another exploded perspective view of a first locking unit of a steering column according to an embodiment of the present invention.

Referring to FIG. 6 and FIG. 7, the second locking unit 320 may include a lever cam block 311, a first tilt cam block 312, a first tilt block 313, a first tilt locking block 314, a first elastic member 315 and a first tilt bushing 316.

The first tilt block 313 includes a ring-shaped body portion 3131 which defines a through hole 3132 along the longitudinal axis of the tilting bolt 32. Also, supporting portions 3133 and 3134 are provided at both end portions on a surface facing the lever 32 among both side surfaces of the body portion 3131. First fixed teeth 3135 for auxiliary tilt locking are provided on a portion of an inner circumference of the body portion 3131. On a surface opposite a surface facing the lever 32 among the two side surfaces of the body portion 3131 an insertion protrusion 3136 which is inserted into a through hole formed in the first arm 211 of the mounting bracket 20 is provided.

The lever cam block 311 is configured to be pushed toward an outer surface of the first arm 211 via a cam operation in response to rotation of the lever 31. The lever cam block 311 may include a cam surface 3113 responding to a cam surface formed on an inner surface of the base portion 311 of the lever 31, and is urged to move toward the first arm 211 via a cam operation so as to apply clamping force to the first tilt block 313 and the first arm 211. Supporting surfaces 3111 and 3112 are formed on both side end portions of the lever cam block 311, and the supporting surfaces 3111 and 3112 are respectively supported by the supporting portions 3133 and 3134 of the first tilt block 313. The lever cam block 311 has a through hole 3114 through which the tilting bolt 32 passes.

The first locking unit 310 is configured to realize a tilt locking by a clamping force generated by the movement of the cam block 311 by the cam operation and at the same time an auxiliary tilt locking through a teeth engagement. The auxiliary tilt locking is realized by the first tilt cam block 312, the first tilt block 313 and the first elastic member 315.

The first tilt cam block 312 is connected to the tilting bolt 32 so as to rotate together with the tilting bolt 32. The first tilt cam block 312 has a through hole 3121 through which the tilting bolt 32 passes, and the through hole 3121 may have a linear portion 3122 corresponding to a linear portion of the tilting bolt 32 to rotate together with the tilting bolt 32. Meanwhile, the first tilt cam block 312 includes a protruded cam 3123 for pushing the first tilt locking block 314 in response to rotation thereof. The protruded cam 3123 may be formed to face the first tilt locking block 314.

The first tilt locking block 314 has first moving teeth 3141 which is formed to be engaged with the fixed teeth 3135 of the first tilt block 313 in response to the cam operation of the protruded cam 3123 by rotation of the first tilt cam block 312. The first moving teeth 3141 faces the first fixed teeth 3135, and an engagement or a disengagement of the first moving teeth 3141 and the first fixed teeth 3135 occurs in response to the movement of the first tilt locking block 314. The first tilt locking block 314 has an indented space for receiving the first tilt cam block 312, and the bottom of the indented space forms a cam supporting surface 3142 contacting the protruded cam 3123 of the first tilt cam block 312. Meanwhile, the first tilt locking block 314 has a supporting surface 3143 which is supported by the first elastic member 315, and the supporting surface 3143 may be disposed beside the first moving teeth 3141.

The first elastic member 315 elastically supports 314 the first tilt locking block 314 in a direction in which the first moving teeth 3141 is separated from the first fixed teeth 3135. That is, the first elastic member 315 provides elastic force to urge the first tilt locking block 314 to move left in FIG. 8. The first elastic member 315 may be a plate spring, and as shown in FIG. 6 the first elastic member 315 may include an elastic force providing portion 3151 having a shape of a convex curve and supporting legs 3152 which are provided at both ends thereof. The elastic force providing portion 3151 is supported against the supporting surface 3142 of the first tilt locking block 314 and the supporting legs 3152 are supported against the supporting portion 3133 of the first tilt block 313.

The first tilt bushing 316 is connected to the lever cam block 311 and is disposed in the through hole 3132 of the first tilt block 313 and has a through hole 3161 through which the first tilt cam block 312 passes. At this time, the first tilt cam block 312 may include a large diameter portion 3124 which is inserted into the through hole 3161 of the first tilt bushing 316 and a small diameter portion 3125 having a relatively smaller diameter. The protruded cam 3123 may be provided at the large diameter portion 3124.

Figure 8:
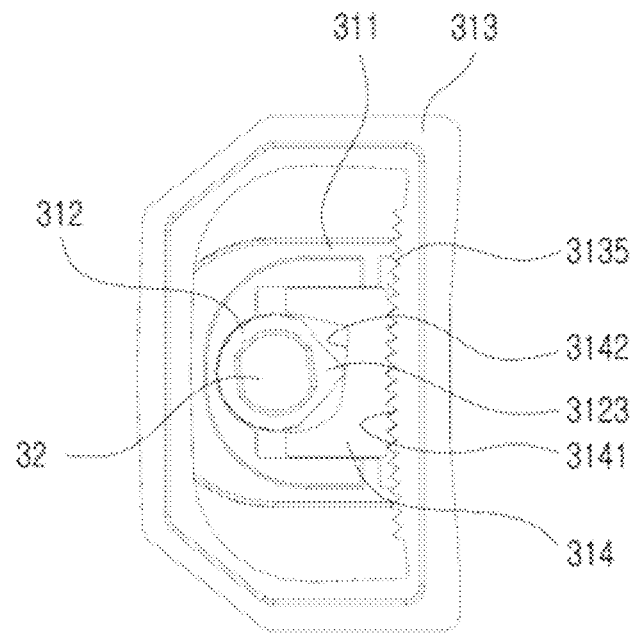
FIG. 8 is drawings respectively showing a locking state and an unlocking state of a first locking unit of a steering column assembly according to an embodiment of the present invention.
Figure 8:
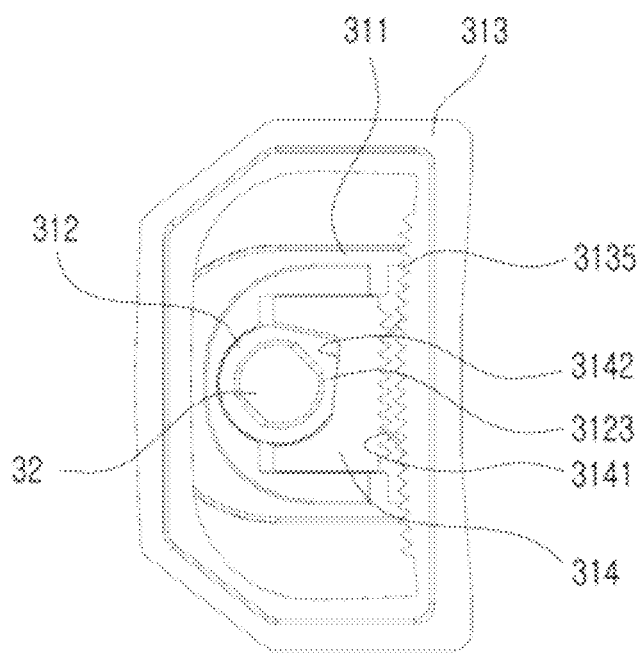

The locking state of the locking device 30 is shown in of FIG. 8, and the unlocking state of the locking device 30 is shown in (b) of FIG. 8. For ease of illustration the first tilt bushing 316 is omitted in FIG. 8. When the locking device 30 is in the locking state, the protruded cam 3123 of the first tilt cam block 312 pushes the first tilt locking block 314 so that the first moving teeth 3141 is engaged to the first fixed teeth 3135. Accordingly, in case that impact is acted on the steering column in the locking state, an auxiliary tilt locking by an engagement of the first moving teeth 3141 and the first fixed teeth 3135 is realized in addition to the tilt locking due to the clamping force. At this time, the first fixed teeth 3135 is elongated approximately in parallel with the tilt direction (vertical direction in FIG. 8). Meanwhile, when the lever 31 and the tilting bolt 32 rotate in an unlocking direction from (a) of FIG. 8, the first tilt cam block 312 rotates in a counter-clock wise in FIG. 8 and thus the first tilt locking block 314 moves left in FIG. 8 by the elastic resilient force of the first elastic member 315, so that the first moving teeth 3142 is disengaged from the first fixed teeth 3135. In an unlocking state a driver can manually regulate a tilt motion of the steering column.

Figure 9:
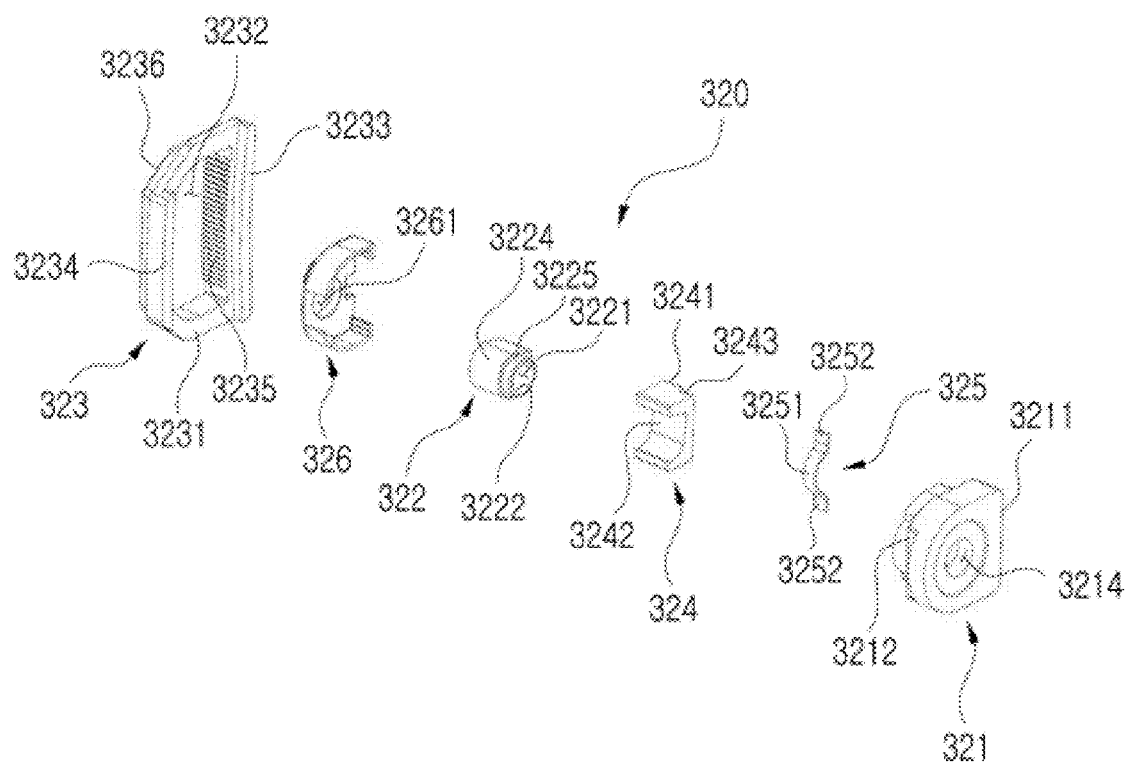
FIG. 9 is an exploded perspective view of a second locking unit of a steering column assembly according to an embodiment of the present invention.
Figure 10:
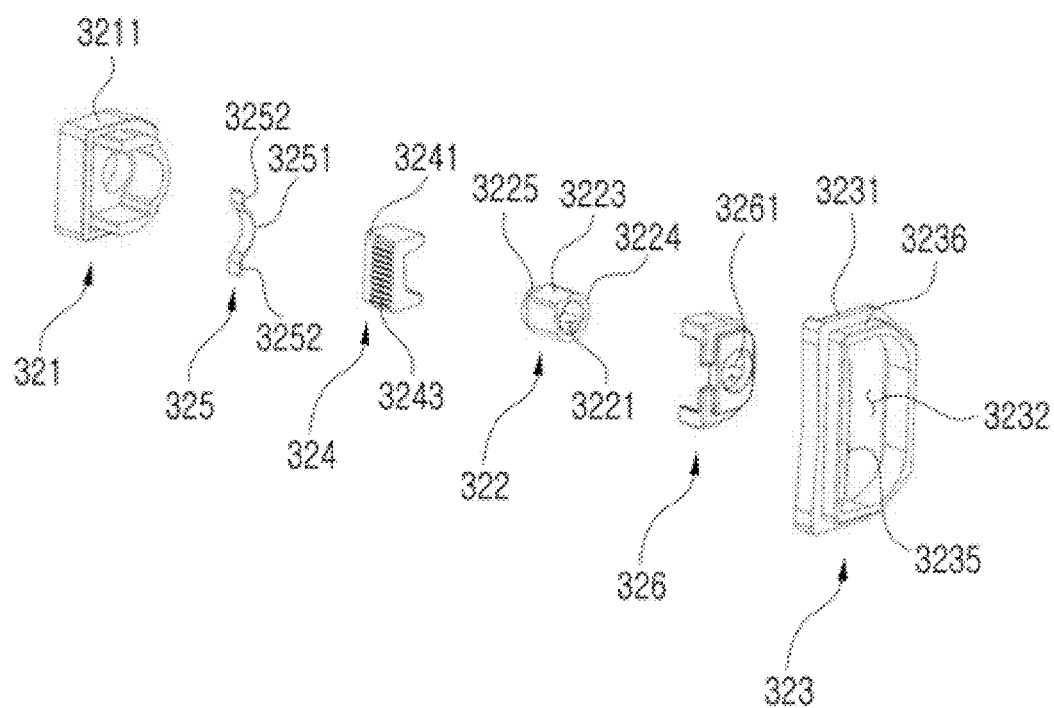
FIG. 10 is another exploded perspective view of a second locking unit of a steering column according to an embodiment of the present invention.

FIG. 9 and FIG. 10 show the second locking unit 320 of the steering column assembly according to an embodiment of the present invention. Referring to FIG. 9 and FIG. 10, the second locking unit 320 may include a guide block 321, a second tilt cam block 322, a second tilt block 323, a second tilt locking block 324, a second elastic member 325 and a second tilt bushing 326.

The second tilt block 323 has a ring-shaped body portion 3231 defining a through hole 3232 along a longitudinal direction of the tilting bolt 32. Also, supporting portions 3233 and 3234 are respectively provided at both ends of an outer surface of the body portion 3231. A second fixed teeth 3235 for an auxiliary tilt locking is formed at a portion of an inner circumferential surface of the ring-shaped body portion 3231. An inserting protrusion portion 3236 which is inserted into a through hole formed in the second arm 212 of the mounting bracket 20 is formed on a surface of the body portion 3231 facing the second arm 212.

The guide block 321 may be supported by a fixing nut 33 which is coupled to the end portion of the tilting bolt 32. As described above, the tilting bolt 32 accordingly rotates to the locking position to realize the locking state in accordance with the rotation of the lever 31 to the locking position, and during this rotation the lever cam block 311 of the first locking unit 310 is urged to move toward the first arm 211 by the cam operation and at this time the tilting bolt 32 is slightly drawn toward the lever 31 due to a reaction of the movement of the lever cam block 311. Accordingly, the guide block 322 which is supported by the fixing nut 33 coupled to the end portion of the tilting bolt 32 is urged to move toward the second arm 212. Thus, the guide block 322 and the second tilt block 323 apply clamping force to the second arm 212 so as to realize the locking of the tilt motion and the telescopic motion. Supporting surfaces 3211 and 3212 are respectively formed on both end portions of the guide block 321, and supporting portions 3233 and 3234 of the second tilt block 323 are respectively supported on the supporting surfaces 3211 and 3212. The guide block 321 has a through hole 3214 through which the tilting bolt 32 passes.

The second locking unit 320 is configured such that an auxiliary tilt locking is realized due to a teeth engagement in addition to a tilt locking due to the clamping force generated by the movement of the guide block 321 in accordance with the axial movement of the tilting bolt 32. Such an auxiliary tilt locking may be realized by the second tilt cam block 322, the second tilt block 323, the second tilt locking block 324 and the second elastic member 325.

The second tilt cam block 322 is connected to the tilting bolt 32 so as to rotate therewith. The second tilt cam block 322 has a through hole 3221 through which the tilting bolt 32 passes, and the through hole 3221 has a linear portion 3222 responding to a linear portion of the tilting bolt 32 for rotation together with the tilting bolt 32. The second tilt cam block 322 is provided with a protruded cam 3223 for pushing the second tilt locking block 324 in response rotation thereof. The protruded cam 3223 may be formed at a side facing the second tilt locking block 324.

The second tilt locking block 324 has a second moving teeth 3241 which is configured to be able to be engaged with the second fixed teeth 3235 of the second tilt block 323 in response to the cam operation of the protruded cam 3223 by the rotation of the second tilt cam block 322. The second moving teeth 3241 is positioned to face the second fixed teeth 3235, and the engagement and the disengagement of the second moving teeth 3241 and the second fixed teeth 3235 are selectively realized by the movement of the second tilt locking block 324. The second tilt locking block 324 has an indented space for receiving the second tilt cam block 322, and the bottom of the indented space forms a cam supporting surface 3242 contacting the protruded cam 3223 of the second tilt cam block 322. The second tilt locking block 324 has a supporting surface 3243 which is supported by the second elastic member 325, and the supporting surface 3243 may be disposed beside the second moving teeth 3241.

The second elastic member 325 elastically supports the second tilt locking block 324 in a direction in which the second moving teeth 3241 is separated from the second fixed teeth 3235. That is, the second elastic member 325 provides elastic force to urge the second tilt locking block 324 to move right in FIG. 11. The second elastic member 325 may be a plate spring, and as shown in FIG. 9 the second elastic member 325 may have an elastic force providing portion 3251 of a convex curve shape and supporting legs 3252 provided on both ends. The elastic force providing portion 3251 is supported against the supporting surface 3243 of the second tilt locking block 324, and the supporting legs 3252 are supported against a supporting portion 3233 of the second tilt block 323.

The second tilt bushing 326 is connected to the guide block 321 to be disposed in a through hole 3232 of the second tilt block 323 and may have a through hole 3261 through which the second tilt cam block 322 passes. At this time, the second tilt cam block 322 may have a large diameter portion 3224 which is inserted into a through hole 3261 of the second tilt bushing 326 and a small diameter portion 3225 having a relatively smaller diameter. The protruded cam 3223 described above may be provided at the large diameter portion 3224.

Figure 11:
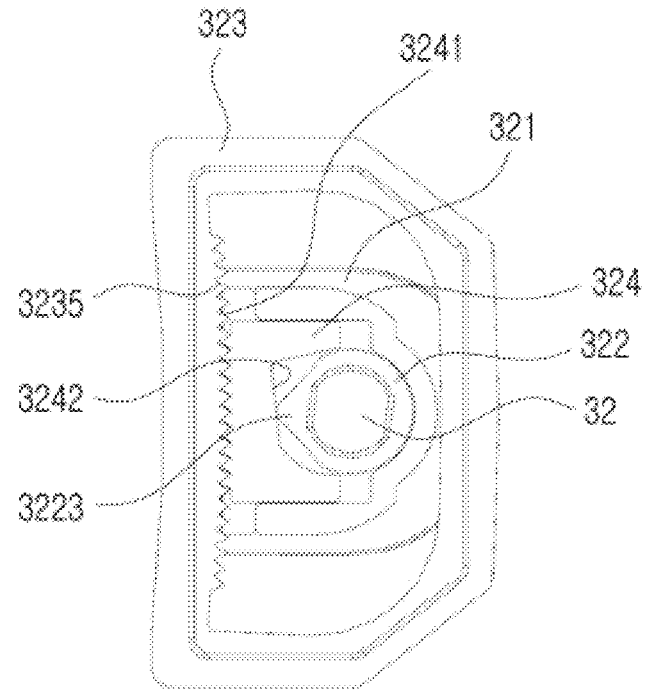
FIG. 11 is drawings respectively showing a locking state and an unlocking state of a second locking unit of a steering column assembly according to an embodiment of the present invention.
Figure 11:
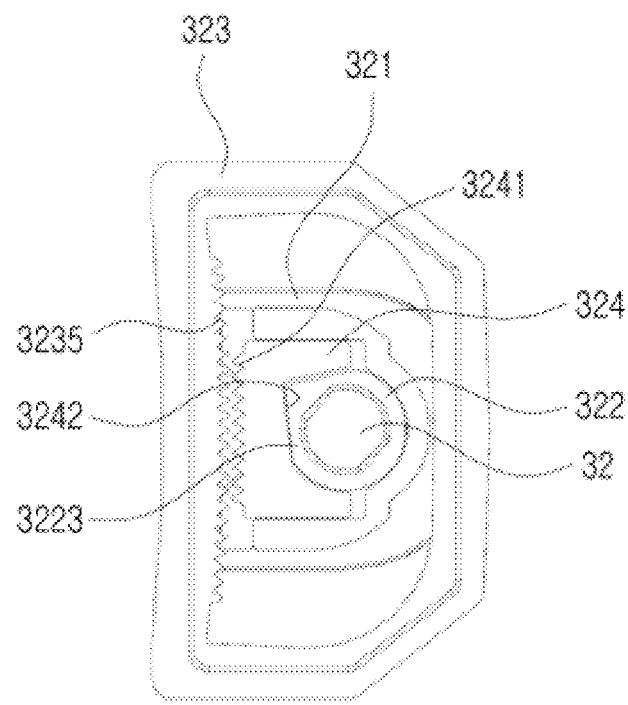

The locking state of the locking device 30 is shown in (a) of FIG. 11, and the unlocking state of the locking device 30 is shown in (b) of FIG. 11. For ease of illustration the first tilt bushing 326 is omitted in FIG. 11. When the locking device 30 is in the locking state, the protruded cam 3223 of the second tilt cam block 322 pushes the second tilt locking block 324 so that the second moving teeth 3241 is engaged to the second fixed teeth 3235. Accordingly, in case that impact is acted on the steering column in the locking state, an auxiliary tilt locking by an engagement of the second moving teeth 3241 and the second fixed teeth 3235 is realized in addition to the tilt locking due to the clamping force. At this time, the second fixed teeth 3235 is elongated approximately in parallel with the tilt direction (vertical direction in FIG. 11). Meanwhile, when the lever 31 and the tilting bolt 32 rotate in an unlocking direction from (a) of FIG. 11, the second tilt cam block 322 rotates in a counter-clock wise in FIG. 11 and thus the second tilt locking block 324 moves right in FIG. 11 by the elastic resilient force of the second elastic member 325, so that the second moving teeth 3242 is disengaged from the second fixed teeth 3235. In an unlocking state a driver can manually regulate a tilt motion of the steering column.

According to an embodiment of the present invention, an auxiliary telescopic locking structure which locks or allows a telescopic motion of the lower jacket 12 in response to the locking state and the unlocking state of the locking device 30 is provided. The auxiliary telescopic locking structure becomes an unlocking state in the unlocking state of the locking device 30 so that the telescopic motion of the lower jacket 12 is allowed, and thus the upper jacket 11 and the lower jacket 12 can slide together for a telescopic motion. Meanwhile, the auxiliary telescopic locking structure becomes a locking state in the locking state of the locking device 30 so that the telescopic motion of the lower jacket 12 is blocked, and in this state the upper steering shaft 13 and the upper jacket 12 can be collapsed while the upper jacket 12 moves relative to the fixed lower jacket 12. During this process the steering column may be collapsed with an energy absorption by an impact energy absorption member.

The auxiliary telescopic locking structure may have a rotating member 37 which is connected to the tilting bolt 32 so as to rotate with the tilting bolt 32 about a longitudinal axis of the tilting bolt 32. As shown in FIG. 1 and FIG. 2, the rotating member 37 may be disposed between the first and the second legs 231 and 232 of the supporting housing 23. The rotating member 37 may include a body portion 38 which is elongated along a longitudinal axis of the tilting bolt 32 and through which the tilting bolt 32 passes, a first and a second legs 39 which are protruded from both ends of the body portion 38 and a driving rod 40 which connects the two legs 39.

Also, the auxiliary telescopic locking structure may include a locking member 41 for a locking function. The locking member 41 is configured to be operated by the rotating member 37 and is disposed between the first and the second legs 231 and 232 of the supporting housing 23 in the vicinity of the rotating member 37. The locking member 41 is rotatably connected to a connecting rod 42 which is connected respectively to the first and the second legs 231 and 232. Referring to FIG. 13, the locking member 41 may have a slot 43 into which the driving rod 40 of the rotating member 37 is inserted, and the slot 43 may be formed to be larger than the driving rod 40. If the rotating member 37 rotates in a counter-clock wise in FIG. 12 about the tilting bolt 32 by the rotation of the lever 31, the locking member 41 rotates in a clock wise in FIG. 12 about the connecting rod 42 by the driving rod 40.

Meanwhile, a first auxiliary telescopic locking teeth 45 is formed on an outer surface of the lower jacket 12, and correspondingly the locking member 41 has a second auxiliary telescopic locking teeth 44. A movement of the lower jacket 12 in a telescopic direction is blocked if the locking teeth 44 of the locking member 41 and the locking teeth 45 of the lower jacket 12 are engaged with one another as shown in FIG. 12, and a movement of the lower jacket 12 is allowed if the two teeth 44 and 45 are disengaged as shown in FIG. 13.

The auxiliary telescopic locking structure may include a biasing member 46 which provides a biasing force to urge the locking member 41 to be in the locking state. For example, the biasing member 46 may be formed of material having an elastic resilient force, and the biasing member 46 provides a biasing force by elastically supporting the locking member 41 to be in the locking position by an elastic resilient force as shown in FIG. 12.

A tolerance ring 50 may be interposed between the upper jacket 11 and the lower jacket 12. The tolerance ring 50 is disposed to contact the outer circumferential surface of the upper jacket 11 and an inner circumferential surface of the lower jacket 12 to generate friction force therebetween which urges the upper jacket 11 and the lower jacket 12 to move together during a telescopic motion. Meanwhile, during the collapse of the steering column, the tolerance ring 50 performs an energy absorption function while allowing the upper jacket 11 to move into the lower jacket 12. For example, when external impact is applied to the steering column, energy absorption occurs while the tolerance ring 50 deforms or an outer surface of the upper jacket 11 and/or an inner surface of the lower jacket 12 is damaged, and during this process the upper jacket 11 is further inserted into the lower jacket 12 so that the steering column is collapsed. In another embodiment, an energy absorption strap having an energy absorption function by a deformation thereof while the steering column is collapsed may be further provided.

Figure 12:
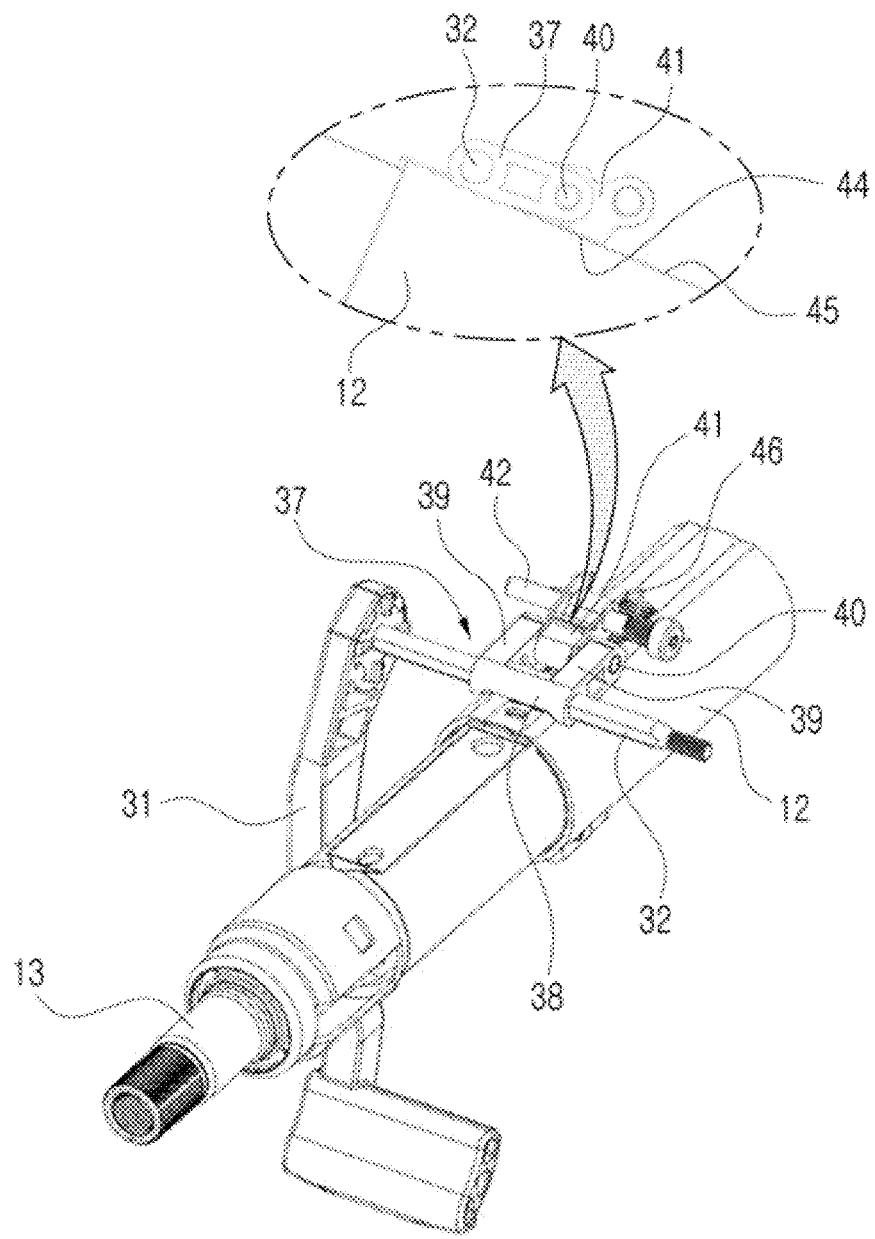
FIG. 12 is a drawing showing a locking state of an auxiliary telescopic locking structure of a steering column assembly according to an embodiment of the present invention.
Figure 13:
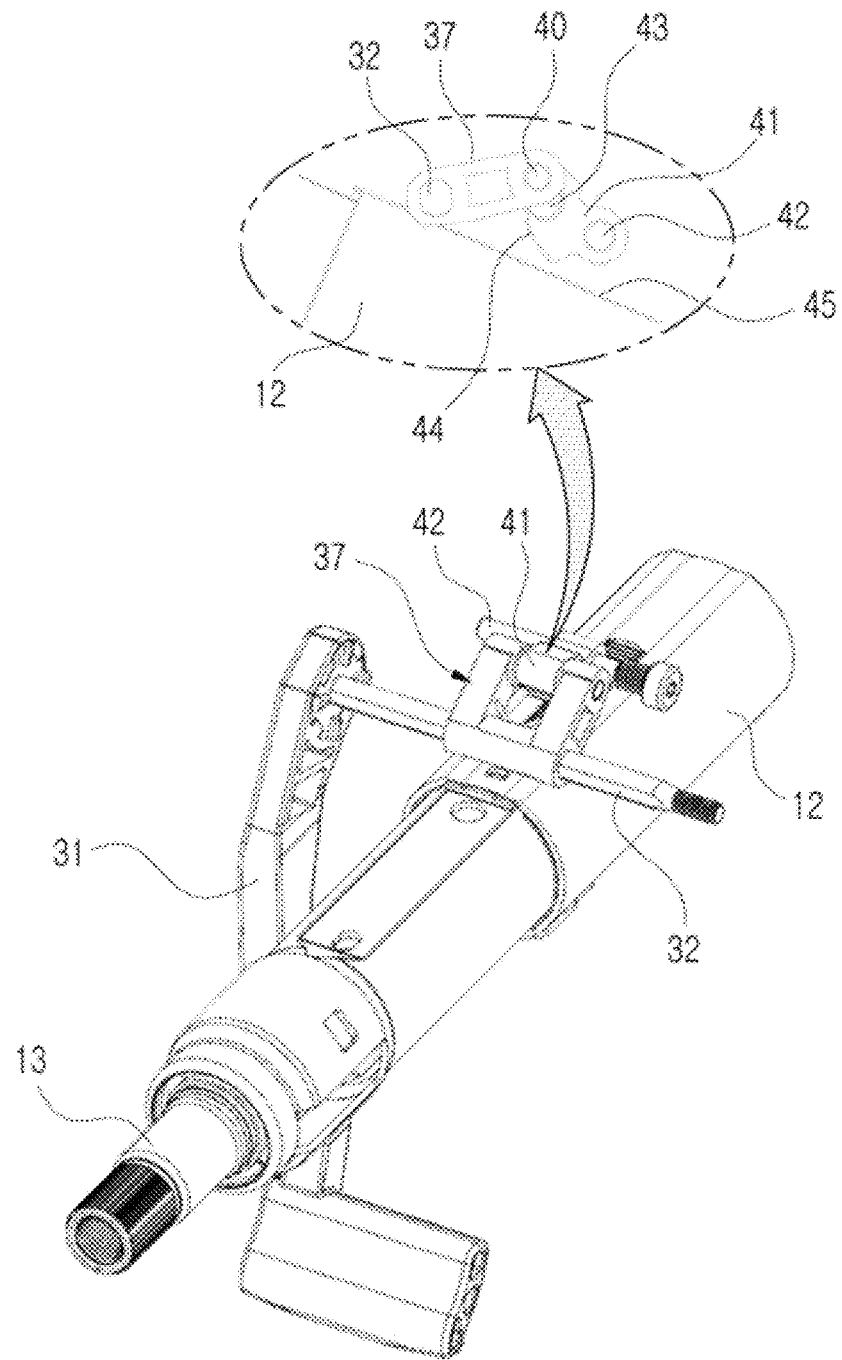
FIG. 13 is a drawing showing an unlocking state of an auxiliary telescopic locking structure of a steering column assembly according to an embodiment of the present invention.

Referring to FIG. 12 and FIG. 13, locking function of the auxiliary telescopic locking structure via teeth engagement will be described. FIG. 12 shows the locking state by teeth engagement, and FIG. 13 shows the unlocking state by teeth disengagement. Referring to FIG. 12, when the lever 31 is in the locking position, the rotating member 37 and the locking member 41 are in the locking position shown in FIG. 12 and thereby the locking teeth 44 of the locking member 41 and the locking teeth 45 of the lower jacket 12 are engaged with one another so that a movement of the lower jacket 12 is blocked. That is, in the locking state of the locking device 30, since the locking teeth 45 and the locking teeth 44 are engaged with one another, a movement of the lower jacket 12 in a telescopic direction is additionally blocked in addition to the locking of the telescopic motion by the clamping force of the locking device in the locking state. Meanwhile, referring to FIG. 13, when the lever 31 is rotated to the unlocking position, the rotating member 37 rotates about the tilting bolt 32 to raise the locking member 41 and thus the locking teeth 44 of the locking member 41 is disengaged from the locking teeth 44 of the lower jacket 12 so that a telescopic movement of the lower jacket 12 is allowed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

INDUSTRIAL APPLICABILITY

The present invention relates to a steering column assembly of a vehicle, so it has an industrial applicability.

The invention claimed is:

1. A steering column assembly comprising:
   a mounting bracket which has a first arm and a second arm facing one another;
   a supporting housing which is disposed between the first arm and the second arm to be tiltable about the mounting bracket;
   a steering column which passes through the supporting housing so as to be able to undergo a tilt motion together with the supporting housing; and
   a locking device which is configured to be in a locking state or an unlocking state to selectively allow a tilt motion of the supporting housing and the steering column by applying or removing clamping force to or from the first arm and the second arm,
   wherein the locking device comprises:
   a lever which is able to rotate between a locking position and an unlocking position;
   a tilting bolt which is connected to the lever to rotate together with the lever and passes through the first arm and the second arm to be able to rotate between the locking state and the unlocking state;
   a first locking unit which is configured to selectively applying a clamping force to the first arm to selectively realize a tilt locking and to selectively realize an auxiliary tilt locking via selective teeth engagement in response to rotation of the tilting bolt; and
   a second locking unit which is configured to selectively applying a clamping force to the second arm to selectively realize a tilt locking and to selectively realize an auxiliary tilt locking via selective teeth engagement in response to rotation of the tilting bolt, wherein the first locking unit comprises:
a lever cam block which is configured to be able to apply a clamping force to the first arm by cam operation in response to rotation of the lever;
a first tilt cam block which is connected to the tilting bolt so as to rotate together with the tilting bolt;
a first tilt block which is connected to the first arm and has a first fixed teeth;
a first tilt locking block which has a first moving teeth which can be engages with the first fixed teeth in response to cam operation by rotation of the first tilt cam block; and
a first elastic member which elastically supports the first tilt locking block in a direction in which the first moving teeth is separated from the first fixed teeth.

2. The steering column assembly of claim 1, wherein the first locking unit is provided between the lever and an outer surface of the first arm, and
wherein the second locking unit is provided at an outer surface of the second arm.

3. The steering column assembly of claim 1, wherein the first tilt block comprises:
a body portion which defines a through hole formed along a longitudinal axis of the tilting bolt;
a pair of supporting portions which are respectively formed on both ends of a surface of the body portion facing the lever; and
an insertion protruded portion which is inserted into a through hole formed in the first arm,
and wherein the first fixed teeth are formed a surface defining the through hole of the body portion.

4. The steering column assembly of claim 3, wherein the lever cam block comprises:
a cam surface for cam operation; and
a pair of supporting surfaces which are respectively supported by the pair of supporting portions of the first tilt block.

5. The steering column assembly of claim 3, wherein the first tilt cam block has a protruded cam, and wherein the first tilt locking block has a receiving space for receiving the first tilt cam block and a cam supporting surface which is formed on a surface forming the receiving space.

6. The steering column assembly of claim 5, wherein the first elastic member is supported against one of the pair of the supporting portions of the first tilt block to elastically support the first tilt locking block.

7. The steering column assembly of claim 6, wherein the first elastic member comprises an elastic force providing portion having a shape of a convex curve supporting the first tilt locking block and a pair of supporting legs which are respectively connected on both ends of the elastic force providing portion, and wherein the pair of supporting legs are supported against the supporting portion of the first tilt block.

8. The steering column assembly of claim 1, wherein the second locking unit comprises:
a guide block which is disposed outside the second arm and is configured to be able to apply clamping force to the second arm in response to an axial movement of the tilting bolt;
a second tilt cam block which is connected to the tilting bolt to rotate together with the tilting bolt;
a second tilt block which is connected to the second arm and has a second fixed teeth;
a second tilt locking block having a second moving teeth which is able to be engaged with the second fixed teeth in response to cam operation by rotation of the second tilt cam block; and
a second elastic member which elastically supports the second tilt locking block in a direction in which the second moving teeth is separated from the second fixed teeth.

9. A steering column assembly comprising:
a mounting bracket which has a first arm and a second arm facing one another;
a supporting housing which is disposed between the first arm and the second arm to be tiltable about the mounting bracket;
a steering column which passes through the supporting housing so as to be able to undergo a tilt motion together with the supporting housing; and
a locking device which is configured to be in a locking state or an unlocking state to selectively allow a tilt motion of the supporting housing and the steering column by applying or removing clamping force to or from the first arm and the second arm,
wherein the locking device comprises:
a lever which is able to rotate between a locking position and an unlocking position;
a tilting bolt which is connected to the lever to rotate together with the lever and passes through the first arm and the second arm to be able to rotate between the locking state and the unlocking state;
a first locking unit which is configured to selective applying a clamping force to the first arm to selectively realize a tilt locking and to selectively realize an auxiliary tilt locking via selective teeth engagement in response to rotation of the tilting bolt; and
a second locking unit which is configured to selectively applying a clamping force to the second arm to selectively realize a tilt locking and to selectively realize an auxiliary tilt locking via selective teeth engagement in response to rotation of the tilting bolt,
wherein the steering column comprises an upper jacket and a lower jacket which are connected to one another to be relatively movable in a longitudinal direction, and
wherein the steering column further comprises:
an auxiliary telescopic locking structure which is configured to selectively allow the lower jacket to move in a longitudinal direction in response to the locking state and the unlocking state of the locking device; and
an energy absorption member which is configured to perform energy absorption when the upper jacket moves relative to the lower jacket in a state that the auxiliary telescopic locking structure does not allow the lower jacket to move in the longitudinal direction.

10. The steering column assembly of claim 9, wherein the auxiliary telescopic locking structure comprises:
a rotating member which is connected to the tilting bolt to rotate together with the tilting bolt;
a locking member which is configured to rotate between a locking position and an unlocking position by rotation of the rotating member; and
a biasing member which provides force to bias the locking member to the locking position.

11. The steering column assembly of claim 10, wherein the rotating member comprises:
a body portion which is connected to the tilting bolt;
a pair of legs which are respectively protruded from both ends of the body portion; and
a driving rod which connects the pair of legs, and wherein the locking member is provided with a slot into which the driving rod is inserted, and wherein the lower jacket and the locking member respectively have locking teeth which are selectively engaged with one another by rotation of the locking member.

12. A steering column assembly comprising:

a mounting bracket which has a first arm and a second arm;

a steering column which passes between the first and the second arms to be tiltable; and a locking device which is configured to be a locking state or an unlocking state to selectively allow a tilt motion of the steering column by applying or removing a clamping force to or from the first arm and the second arm, wherein the locking device comprises:

a lever which is able to rotate between a locking position and an unlocking position;

a tilting bolt which passes through the first arm and the second arm to be able to rotate between the locking state and the unlocking state; and a first locking unit and a second locking unit which are configured to operate respectively in response to rotation of the tilting bolt and are configured to be able to selectively apply clamping force to the first and the second arms from outside of the first and the second arms, wherein the first locking unit comprises:

a lever cam block which is configured to be able to apply a clamping force to the first arm by cam operation in response to rotation of the lever;

a first tilt cam block which is connected to the tilting bolt so as to rotate together with the tilting bolt;

a first tilt block which is connected to the first arm and has a first fixed teeth;

a first tilt locking block which has a first moving teeth which can be engaged with the first fixed teeth in response to cam operation by rotation of the first tilt cam block; and a first elastic member which elastically supports the first tilt locking block in a direction in which the first moving teeth is separated from the first fixed teeth.

13. The steering column assembly of claim 12, wherein the second locking unit comprises:

a guide block which is configured to be able to apply clamping force to the second arm in response to an axial movement of the tilting bolt;

a second tilt cam block which is connected to the tilting bolt to rotate together with the tilting bolt;

a second tilt block which is connected to the second arm and has a second fixed teeth;

a second tilt locking block having a second moving teeth which is able to be engaged with the second fixed teeth in response to cam operation by rotation of the second tilt cam block; and a second elastic member which elastically supports the second tilt locking block in a direction in which the second moving teeth is separated from the second fixed teeth.

* * * * *